March 2, 1943.                W. R. MILLER                    2,312,353
                              CONTROL SYSTEM
                           Filed Nov. 30, 1939

INVENTOR.
Wayland R. Miller
BY
ATTORNEY.

Patented Mar. 2, 1943

2,312,353

UNITED STATES PATENT OFFICE 2,312,353

CONTROL SYSTEM

Wayland R. Miller, Milwaukee, Wis., assignor to Perfex Corporation, Milwaukee, Wis., a corporation of Wisconsin Application November 30, 1939, Serial No. 306,852

3 Claims. (Cl. 236—9)

This invention relates in general to control systems and more particularly to heating control systems where some electrical means is employed in the system to force circulation of the heating medium employed and where some second electrical means is used to control the rate of combustion of fuel in the heating system. The first mentioned means may be, for example, a fan in the case of a warm air system or a pump in the case of a hot water system. The second mentioned means may be, for example, a draft regulator, a stoker or an oil burner.

Usually it is desirable to maintain hot water for domestic use throughout the year. During the winter months when heat is required for conditioning rooms, it is an easy matter to install an auxiliary coil in a boiler or furnace and take some of the heat generated by the burning fuel to heat the domestic water. Although the heat generating means may be controlled directly from room temperatures or other room conditions, there will be sufficient heat required for conditioning the rooms on the average, to maintain the domestic hot water at or above a desirable temperature. During mild weather or during the summer months, however, little or no heat is required for conditioning rooms and if the heat generating means is controlled responsive to room temperatures, there will not be sufficient heat generated to heat the domestic hot water to a desirable temperature.

Formerly, to alleviate this condition, an auxiliary heater was used to heat the domestic hot water alone during the summer months. It has been found, however, that domestic hot water may be obtained more economically by operating an auxiliary coil in the main heat generating means intended primarily for conditioning the rooms, rather than operating an auxiliary heater.

A system intended to perform this dual function must be so controlled that regardless of the time of year, the heating plant will operate to insure domestic hot water of sufficient temperature and at the same time, if no heat is required in the rooms, transmission of heat from the heat generating means to the rooms will not occur. These functions are in addition to the customary function of supplying heat to the rooms being conditioned when such heat is required.

Heat generating means may be segregated into two general classes. In the first class, combustion of the fuel ceases immediately in response to a control action. Oil and gas burners are examples of this class. In the second class, combustion of the fuel does not cease in response to control action but "overruns." An automatic stoker or an automatic draft regulator are examples of this class.

The customary control for preventing excessive temperature or pressure in a heating system is an electrical switch operated by the conditions of the heating medium and is called a high limit control. When an excessive condition is detected, a switch in the electric circuit to the heat generating means is opened. If the heat generating means is of the second class when this electric switch action takes place, the heat generation does not stop and the temperature and pressure may rise to a still greater excess. To prevent such operation from resulting in seriously dangerous conditions, it is customary to provide some means which will proceed to remove heat from the heat generating means at an increased rate when excessive temperature or pressure is detected. When this kind of safety operation is used it is termed "overrun safety."

The primary object of this invention is to provide a new and improved control system for a heating system.

Another object is to provide a new and improved control system having all of the desirable control features of a domestic heating plant with a minimum number of controls.

Another object is to provide a new and improved control system which will operate a heating system having a single heat producing means to supply domestic hot water all year around and provide satisfactory heating of a space to be heated at such time as may be required.

Another object is to provide a new and improved control system which will prevent hazardous operation of a heating plant due to overrun of a heat generating means.

Another object is to provide complete control for a heating system by the joint operation of a means responsive to space conditions and two thermostats responsive to the temperature of the heating medium.

Another object is to provide a new and improved control system which will operate to maintain the temperature of a heating medium above a predetermined amount at all times, to permit heat to be supplied to a space to be heated when required, and to allow heat to be supplied to the space although it is not required in the event the temperature of the heating means exceeds a predetermined temperature.

Other objects and advantages reside in certain novel features of construction, circuit arrangement, and operation of the various parts and elements which will be hereinafter more fully described in the specification, particularly pointed out in the appended claims and of which a preferred embodiment is illustrated in the accompanying sheet of drawings forming a part thereof:

Figure 1:
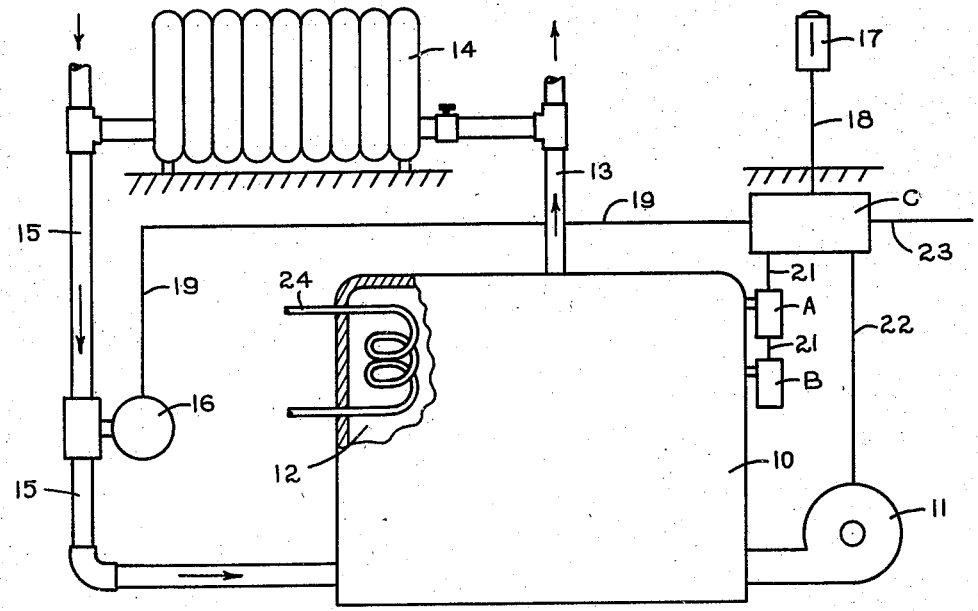
Figure 1 is a diagrammatic showing of the invention applied to a hot water heating system.

Referring first to Figure 1 of the drawing, a furnace or boiler 10 of the customary design is shown. The boiler 10 is equipped in the usual manner with a heat generating means such as the oil burner 11 arranged to heat a heating medium such as the boiler water 12, it being understood that the oil burner 11 is equipped with the usual starting and safety controls not shown here. A riser 13 is connected to the top of the boiler 10 for the purpose of conveying water 12 from the boiler to the heat dissipating system of the heating system. One of the heat dissipators is shown as the radiator 14 situated in a portion of the space to be conditioned for the purpose of dissipating heat to the space.

A return line 15 is shown extending from the radiator 14 to the boiler 10 for the purpose of returning the heating medium from the heat dissipating system to the boiler. A transporting means such as the pump or water circulator 16 is shown in the return line 15 for forcing the movement of the heating medium 12 through the boiler 10 and the radiator 14 as well as the remainder of the radiating system. A physical condition responsive means such as the space thermostat 17 is indicated to be positioned in the space being conditioned so as to be actuated by the temperature of the space. Physical condition responsive devices responsive to the temperature of the heating medium 12 in the boiler 10 are indicated generally as thermostats A and B. C indicates generally a relay and other accessory control devices which may be desirable for operating the oil burner. Wiring in conduits 18, 19, 21 and 22 serves to interconnect the thermostat 17, the circulator 16, the relay and accessory devices C, the two thermostats A and B and the burner 11. Conduit connector 23 serves to bring a source of power into the system. The interconnection and arrangement of these devices comprise the control system of the invention and will be more fully set out hereinafter.

A domestic hot water heater is shown as the heater coil 24 immersed in the heating medium 12. The heater coil 24 heats the domestic hot water in an isolated system communicating with the main heating system, for which the heating medium 12 is provided, only to the extent of extracting some of the heat generated by the burner 11.

Figure 1 is shown merely to give an example of a representative system which might be controlled by the heating system control of the invention. It is not intended to be the only kind of system that might be controlled, it being understood that considerable modifications in the component parts of the system might be made without departing from the spirit of the invention.

For example, the heating coil 24 might be what is known in the art as an external "side arm" heater or indirect heater, the burner might be a stoker, the boiler 10 might be a steam boiler, etc.

Figure 2:
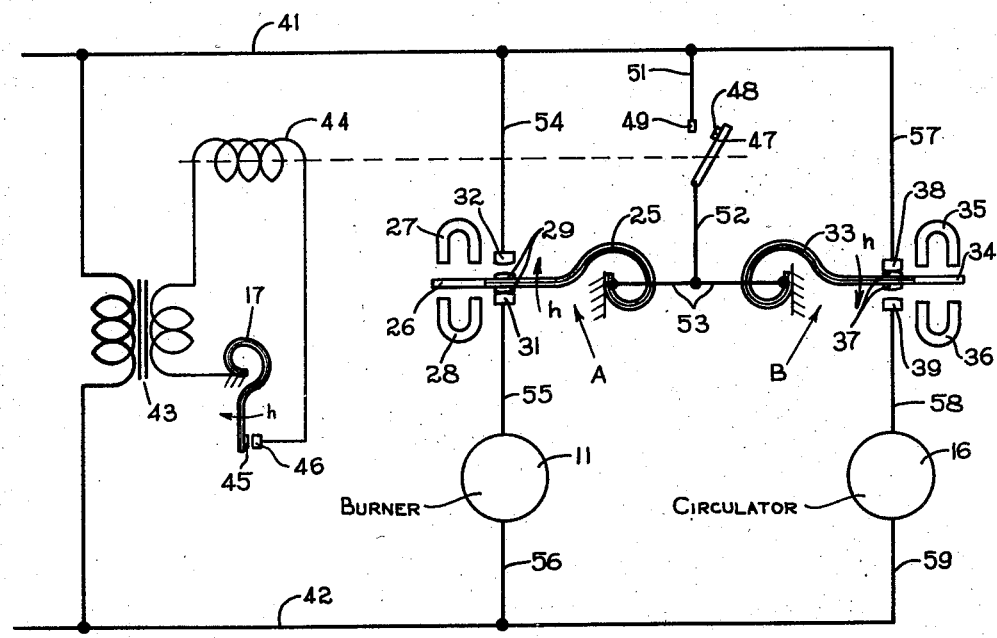
Figure 2 is a schematic diagram of the electrical circuits employed in the invention.

Referring now particularly to Fig. 2, it will be seen that the devices generally set out in Fig. 1 have been schematically shown in part in Fig. 2 following the same nomenclature. In addition, certain details of some of the devices indicated generally have been shown in order that the circuit arrangement will be readily understood. Thermostat A is represented as a bimetal element 25 responsive to the temperature of the water in the interior 12 of the boiler. Secured to the bimetal element 25 in any suitable manner is the magnetic armature 26. Magnets 27 and 28 are provided to oppositely bias the magnetic armature 26 and consequently the bimetal element 25, and to render the action of the bimetal element 25 snap acting. A pair of contacts 29 are arranged on opposite sides of the bimetal element 25 and are arranged to contact an opposing contact point 31 when the bimetal is in its cold position and to engage the contact point 32 when the bimetal is in its hot position, it being understood that the bimetal deflects from its cold position in contact with the contact point 32 as the temperature of the heating medium rises from a lower temperature to a higher temperature. The magnets 27 and 28, because of the biasing action on the magnetic armature 26, cause the engagement or disengagement of the contact points with snap action. The magnets 27 and 28 may be so arranged that when the cold contact is disengaged, the bimetal contacts 29 will remain in a neutral position between the contact points 31 and 32 or they may be alternately arranged so that when the bimetal contacts 29 and 31 are disengaged, the bimetal contacts 29 and the contact 32 will be immediately engaged, that is, the contacts 29 will snap from one contact point to the other. It is understood that when the boiler water temperature falls from a higher temperature to a lower temperature, the bimetal element 25 control action will be correspondingly reversed.

The thermostat B is represented in a manner similar to the thermostat A. A bimetal element 33 is shown together with an associate magnetic armature 34, a pair of magnets 35 and 36 and a pair of contacts 37. In a similar way, a contact point 38 is shown to be engaged when the bimetal element 33 is in the cold position and a contact point 39 is shown to be engaged when the bimetal element 33 is in the hot position. The magnets 35 and 36 for the thermostat B may be arranged in alternate positions similar to the arrangement described in reference to thermostat A. The thermostats A and B have identical structures but, as will be pointed out hereinafter, the temperature level at which they operate is adjustable and may be set so that one operates at a higher or lower boiler water temperature than the other. Line conductors 41 and 42 serve to convey power from a commercial electrical source to the control system. The primary of a transformer 43 is connected between the line conductors 41 and 42. The space thermostat 17 is connected in series with the secondary of the transformer 43 and a relay coil 44. The space thermostat 17 is arranged to close the thermostat contacts 45 and 46 upon a fall in temperature and thereby energizes the relay coil 44 from the secondary of the transformer 43. The relay coil 44, when energized, serves to operate the relay armature 47 to close the relay contacts 48 and 49. As is customary in the art, the contacts 45 and 46 of the thermostat 17 are arranged to operate with snap action.

The relay contact 49 is electrically connected to the line conductor 41 by means of conductor 51. The relay contact 48 is electrically connected to the bimetal elements 25 and 33 by means of the electrical conductors 52 and 53 and the relay armature 47.

The hot contact point 32 of the thermostat A is connected to the conductor 41 by means of the conductor 54. The cold contact point 31 of this thermostat is connected through the oil burner 11 to the line conductor 42 by means of conductors 55 and 56. The cold contact point 38 of the thermostat B is connected to the line conductor 41 by means of a conductor 57. The hot contact 39 of this thermostat is connected to the line conductor 42 through the circulator 16 by means of conductors 58 and 59.

Operation

Assume that the space thermostat 17 has been so adjusted that it will close its contacts when the temperature of the space being heated falls below 70°. Assume that the thermostat B is adjusted to move from its cold position to its hot position when the temperature of the boiler water exceeds 160°, and further, assume that the thermostat A is adjusted to move from its cold position to its hot position when the temperature of the boiler water 12 exceeds 210°. Now, also assume that the system has been newly installed and is to be operated for the first time.

Under these conditions, the boiler water temperature will be at room temperature, which might be 60°, for example, and consequently the bimetal contacts 37 of thermostat B will be in contact with the cold contact point 38 and the contacts 29 of the thermostat A will be in contact with the cold contact point 31. A first circuit is established for the burner 11 extending from the line conductor 41 through conductor 57, cold contact point 38, one of bimetal contacts 37, bimetal element 33, conductor 53, bimetal element 25, one of bimetal element contacts 29, cold contact point 31, conductor 55, oil burner 11, conductor 56 to the line conductor 42.

Since the room temperature is assumed to be 60°, the space thermostat contacts 45 and 46 will be closed and the relay coil 44 will operate the relay armature 47 to close the relay contacts 48 and 49. When the relay contacts 48 and 49 are closed, a second circuit for the oil burner 11 is established. This second circuit extends from the conductor 41 through the conductor 51, relay contacts 49 and 48, relay armature 47, conductor 52, conductor 53, bimetal element 25, one of bimetal contacts 29, cold contact point 31, conductor 55, oil burner 11, conductor 56 to the line conductor 42.

These circuit connections serve to operate the oil burner 11 which will, in turn, generate heat by burning the fuel supplied to it. The heat thus generated will increase the temperature of the boiler water 12. When the temperature of the boiler water 12 reaches the temperature for which the thermostat B is set (160°), the bimetal element 33 snaps from its cold position to its hot position opening the first circuit at contacts 37 and 38 and establishes a second circuit between contacts 37 and 39. However, the oil burner 11 continues to run because of the second circuit established by the action of the relay. This control action of the bimetal element 33 serves to start the circulator motor 16 through a circuit which extends from the line conductor 41, through the conductor 51, the relay contacts 49 and 48, relay armature 47, conductor 52, conductor 53, bimetal element 33, one of bimetal element contacts 37, hot contact 39, conductor 58, circulator 16, conductor 59 to the line conductor 42.

When the circulator is energized, the portion of the boiler water 12 which has been in the boiler 10 and has been heated by the burner 11 will be moved out of the boiler, transported to and circulated through the radiating system. The water 12 will flow from the boiler 10, through the delivery pipe 13, the radiators of the system of which the radiator 14 is one, the return line 15 through the circulator 16 and again return to the boiler.

In this way, the heat which has been generated by the oil burner 11 is conveyed to the space desired to be heated. As this action continues, the temperature of the space will gradually increase until it exceeds the temperature for which the space thermostat 17 has been set to operate (70°). When this point is reached, the space thermostat 17 opens its contacts 45 and 46 deenergizing the relay coil 44 which causes the relay armature 47 to open the relay contacts 48 and 49. Immediately pursuant to this action, both the oil burner 11 and the circulator 16 will stop since prior to this action power to both was supplied solely through the circuit extending through the relay contacts 48 and 49.

In the absence of heat being supplied to the space, the space temperature will gradually fall, causing the space thermostat 17 to close its thermostat contacts 45 and 46 and in turn causing the relay armature 47 to engage the relay contacts 48 and 49. This will cause the oil burner 11 to be started through a circuit extending through the cold contact 31 of the thermostat A. Now, if during the interval of time following the preceding operation of the oil burner 11, the temperature of the boiler water 12 has not dropped below the temperature setting of the thermostat B (160°), the circulator 16 will also be started as a result of the space thermostat operation since upon closure of the relay contacts 48 and 49 a circuit for the circulator will extend through the hot contact 39 of the thermostat B. However, if during this interval of time the temperature of the boiler water 12 has dropped below the setting of the thermostat B (160°), the circulator will not be started. If this latter circumstance prevails, however, the oil burner 11 would be operating prior to the action of the thermostat 17, as will be pointed out hereinafter.

Assuming the first condition prevails, the oil burner 11 and the circulator 16 will continue to operate until the space thermostat 17 is again satisfied and causes the relay contacts 48 and 49 to open.

An exception to this normal operation occurs if due to the heating action of the oil burner 11, the temperature of the boiler water 12 rises in excess of the setting of the thermostat A (210°), before the space thermostat 17 is satisfied. This might happen for example during very severe weather when the room thermostat 17 would be almost continuously calling for heat and the circulator 16 and the radiating system would be unable to dissipate heat as rapidly as the oil burner would be able to generate it. If this condition arises, the thermostat A causes its bimetal 25 to snap from the cold position to the hot position thus interrupting the circuit to the oil burner at the cold contact 31. The thermostat A in performing this function, serves as the conventional high limit control.

The thermostat B, in operating as described, performs the usual function of a "reverse acting"

circulator control but the thermostat B also has another function which will now be described.

The heating system described herein is equipped to provide domestic hot water, regardless of climatic conditions, from the same general source of heat which supplies heat for the space to be heated. Consequently, in order that the domestic hot water will have the required temperature, the oil burner 11 must operate regardless of whether or not any heat is required in the space being heated. For this reason the space thermostat 17 cannot operate the oil burner 11 alone. The thermostat B works in conjunction with the space thermostat 17 to operate the oil burner 11 when heat is required for domestic hot water but is not required for heating the space. The thermostat B is so arranged that it maintains a circuit through the oil burner through its cold contact 38 independent of the action of the space thermostat 17 providing the thermostat A remains in its cold position and maintains a closed circuit through its cold contact 31. Thus it is seen that the thermostat B in its second function serves as a "low limit" control for the boiler and by its control action starts the oil burner 11 when necessary to keep the boiler water temperature above a predetermined level regardless of other conditions.

In some heating installations and particularly in those using an automatic coal stoker rather than the oil burner 11, difficulty is experienced by overruns as previously described. Assume for example that climatic conditions cause the stoker to run a considerable amount of the time so that the temperature of the boiler water exceeds the temperature for which the high limit control is set to operate and further assume that shortly after the high limit control causes the stoker to stop, the space thermostat 17 also causes the circulator 16 to stop because a satisfactory temperature condition exists in the space. The fire which has been burning vigorously because of almost continual stoker operation does not die down immediately but continues to burn at a relatively rapid rate and continues to furnish considerable heat to the boiler water 12. So long as the boiler water 12 is circulated in the dissipating system, the temperature of the boiler water 12 in the boiler 10 does not considerably increase above its established temperature but when the circulator 16 stops there is no place for the heat being furnished by the stoker to be dissipated and unless further steps are taken, the temperature of the boiler water 12 rises an appreciable amount and dangerous conditions result. For this reason the thermostat A is so set and so connected that when excessively high boiler water conditions are reached, a circuit for the circulator 16 is closed regardless of whether or not heat is required in the space. When the boiler water temperature exceeds the temperature setting of the thermostat A (210°), the bimetal 25 snaps to its hot position, establishing a circuit for the circulator 16 from line conductor 41, through conductor 54, hot contact point 32, one of the bimetal contacts 29, bimetal element 25, conductor 53, bimetal element 33, one of the bimetal contacts 37, hot contact 39, conductor 58, circulator 16, conductor 59, to line conductor 42. This action causes operation of the circulator and as a result heat being generated by the overrun of the stoker is removed from the boiler and damage to the heating system or other dangerous consequences resulting from over-heating are prevented.

Both the thermostats A and B perform dual functions and the invention resides principally in the inter-connection of the thermostats with the other component parts of the system, the inter-connection being such as to provide a simple control system which fully protects against all of the recognized hazards and yet performs in a fully satisfactory manner. It will be seen that the thermostat B, first, controls the system as a low limit control and assures that the boiler water temperature is always sufficiently high to provide adequate domestic hot water, and second, it controls the circulator 16 to prevent the circulation of cold water through the radiating system to prevent undue and unnecessary operation of the circulator 16 as well as to prevent cooling of the boiler water 12 when the oil burner or stoker 11 is attempting to heat it sufficiently to provide the requisite hot water. The thermostat A, first, operates as a high limit control to prevent operation of the stoker or oil burner 11 when the temperature of the boiler water 12 is excessive and, second, it operates as an overrun safety control to prevent the occurrence of dangerous conditions by functioning to assure that the circulator will operate when the temperature of the boiler water is excessive. It will be seen that four separate and distinct control functions are being accomplished by but two thermostats.

The description of the operation of the thermostats A and B contemplates their being constructed so as to snap from their hot position to their cold position and vice versa in one operation. It is to be understood that if found desirable, these controls may be made with a neutral or dead position so that in the course of their operation they will move, for example, from the hot position to the neutral position at one selected temperature and from the neutral position to the cold position at another selected temperature. With this mode of operation, the thermostat A might be set to operate as a high limit control and stop the burner 11 at one temperature but would fail to start the circulator in pursuance to the overrun safety feature until a higher temperature was reached.

As was explained heretofore, the operation of the thermostats may be altered by altering the arrangement of the magnets which control the snap action.

It is further to be understood that it is not the intention to limit the invention to the specific construction of the thermostats disclosed here. Any thermostats embodying the essential operating features of the thermostats here disclosed may be substituted with equally satisfactory results. For example, thermostats of the type disclosed in copending application Serial No. 287,263, Homer E. Malone, filed July 29, 1939, may be substituted for the thermostats A and B. The space thermostat 17 has been shown as a low voltage instrument operating a relay merely as an example of one way of performing the switching function of the space thermostat. It would be obvious to one skilled in the art that a line voltage thermostat may be inserted between the conductors 51 and 52 instead of the relay contacts 48 and 49 with equally satisfactory results.

The description herein relative to the space thermostat 17 has been confined to the operation of a device responding solely to temperature. It should be understood that this system will work equally satisfactory or perhaps more so if a device responding jointly to several physical conditions of the space, is substituted for the thermostat. Such a device might be a so-called psychrometric control which would respond to a combination of physical conditions, two of which would be temperature and relative humidity.

While the features of the invention have been illustrated and described in only one of its practical applications, it will be understood that other applications thereof may be apparent to those skilled in the art and it is therefore desired that the invention be not limited to the particular disclosure made but only to the scope of the appended claims.

What is claimed is:

1. In a control system for a heating system including a heater having fuel combustion means and fluid circulating means for circulating heating fluid to a space, the combination of, switching means controlled in accordance with the demand for heat in said space, control means responsive to the temperature of the heating means, said control means comprising a first switching mechanism of the double throw type having a common terminal connected to a first terminal when the heater temperature is below a predetermined low value and connected to a second terminal when the heater temperature is above said low value, said control means also comprising a second switching mechanism of the double throw type including a common terminal which is connected to a first terminal when the heater temperature is above a predetermined high value and which is connected to a second terminal when the heater temperature is below said high value, circuit connections for connecting said switching means to one side of a source of power and directly to and in series with the common terminals of said switching mechanisms, circuit connections between the first terminals of said switching mechanisms and said one side of the source of power for shunting said switching means, a circuit connection between the second terminal of the first switching mechanism and the circulating means, a circuit connection between the second terminal of the second switching mechanism and the combustion means, and circuit connections for directly connecting the combustion means and circulating means to the other side of the source of power.

2. In a control system for a heating system including a heater having fuel combustion means and fluid circulating means for circulating heating fluid to a space, the combination of, switching means controlled in accordance with the demand for heat in said space, control means responsive to the temperature of the heating means, said control means comprising a first switching mechanism of the double throw type having a common terminal connected to a first terminal when the heater temperature is below a predetermined low value and connected to a second terminal when the heater temperature is above said low value, said control means also comprising a second switching mechanism including first and second terminals which are connected together when the heater temperature is below a predetermined high value and which are disconnected when the heater temperature is above said high value, circuit connections for connecting said switching means to one side of a source of power and directly to and in series with the common terminal of said first switching mechanism and one terminal of said second switching mechanism, a circuit connection between the first terminal of the first switching mechanism and said one side of the source of power for shunting said switching means, a circuit connection between the second terminal of said first switching mechanism and the circulating means, a circuit connection between the other terminal of the second switching means and the combustion means, and circuit connections for directly connecting the combustion means and circulating means to the other side of the source of power.

3. In a control system for a heating system including a heater having fuel combustion means and fluid circulating means for circulating heating fluid to a space, the combination of, a first switch controlled in accordance with the demand for heat in said space, a second thermostatic switch controlled in accordance with the heater, said second switch comprising a switch arm, a first contact engaged thereby when the heater temperature is below a predetermined low value and a second contact engaged by said switch arm when the heater temperature is above said predetermined low value, a third thermostatic switch including a switch arm and a contact engaged thereby when the heater temperature is below a predetermined high value, and connections between a source of power, said switches, said fuel combustion means and said circulating means, said connections providing a first energizing circuit for said fuel combustion means through said first and third switches and a second energizing circuit therefor through the first contact of said second switch, said connections also providing an energizing circuit for said circulating means through the first switch and the second contact of the second switch.

WAYLAND R. MILLER.